(12) United States Patent
Pepper et al.

(10) Patent No.: US 11,102,104 B1
(45) Date of Patent: Aug. 24, 2021

(54) METHODS, SYSTEMS, AND COMPUTER READABLE MEDIA FOR GENERATING ANALOG-DISTORTED TEST DATA

(71) Applicant: Keysight Technologies, Inc., Santa Rosa, CA (US)

(72) Inventors: Gerald Raymond Pepper, Newbury Park, CA (US); Sanjay Cartic, Woodland Hills, CA (US); Hadrien Louchet, Stuttgart (DE)

(73) Assignee: Keysight Technologies, Inc., Santa Rosa, CA (US)

( * ) Notice: Subject to any disclaimer, the term of this patent is extended or adjusted under 35 U.S.C. 154(b) by 93 days.

(21) Appl. No.: 16/557,426

(22) Filed: Aug. 30, 2019

(51) Int. Cl.
*H04W 72/04* (2009.01)
*H04L 12/26* (2006.01)
*H04L 1/24* (2006.01)
*G06F 11/10* (2006.01)
*G06F 11/263* (2006.01)

(52) U.S. Cl.
CPC ............. *H04L 43/50* (2013.01); *H04L 1/24* (2013.01); *G06F 11/10* (2013.01); *G06F 11/263* (2013.01)

(58) Field of Classification Search
CPC . H04L 43/50; H04L 1/24; G06F 11/10; G06F 11/263
See application file for complete search history.

(56) References Cited

U.S. PATENT DOCUMENTS

| 5,710,781 | A | 1/1998 | Zinser et al. |
| 5,889,791 | A | 3/1999 | Yang |
| 5,896,403 | A | 4/1999 | Nagasaki et al. |
| 6,320,852 | B1 | 11/2001 | Obuchi et al. |
| 6,684,351 | B1 | 1/2004 | Bendak et al. |

(Continued)

FOREIGN PATENT DOCUMENTS

EP    1 204 240 A2    5/2002

OTHER PUBLICATIONS

Final Office Action for U.S. Appl. No. 16/453,941 (dated Aug. 25, 2020).

(Continued)

*Primary Examiner* — Hassan Kizou
*Assistant Examiner* — Mahbubul Bar Chowdhury (57) ABSTRACT

Conventional test systems can experience issues when attempting to test network nodes or system with realistic high speed forward error correction (FEC) encoded test data. For example, a test system may use a packet data generator to generate eight data streams or lanes of 50 Gigabits per second (Gbps) test data and may then use a multiplexer to combine the eight lanes into a 400 Gbps data stream for transmission using 4-level pulse amplitude modulation (PAM4). To generate a high speed data stream comprising multiple data lanes, the test system may be required to use a master clock or other time synchronization technique to keep the data lanes in sync. Further, to generate an FEC encoded high speed data stream comprising multiple data lanes, the test system may perform FEC encoding across all of the data lanes comprising the high speed data stream, which can make test data modifications difficult afterwards. Hence, issues can arise if a packet data generator lacks capabilities, e.g., analog distortion or analog fuzzing features, that are needed for testing some aspect of network node functionality.

20 Claims, 3 Drawing Sheets

(56) References Cited

U.S. PATENT DOCUMENTS

| | | | |
|---|---|---|---|
| 8,838,722 | B2 | 9/2014 | Ridges et al. |
| 9,331,714 | B1* | 5/2016 | Yang .................. H04L 1/004 |
| 10,236,907 | B2 | 3/2019 | Szczepanek et al. |
| 10,567,123 | B2 | 2/2020 | Pepper |
| 2003/0106014 | A1 | 6/2003 | Dohmen et al. |
| 2006/0245505 | A1 | 11/2006 | Limberg |
| 2006/0246836 | A1 | 11/2006 | Simon |
| 2008/0065942 | A1 | 3/2008 | Pleasant |
| 2015/0163123 | A1* | 6/2015 | Kitchener ............. H04L 43/50 370/252 |
| 2018/0123613 | A1 | 5/2018 | Szczepanek et al. |
| 2019/0268110 | A1 | 8/2019 | Pepper |
| 2019/0303033 | A1 | 10/2019 | Noguera Serra et al. |
| 2019/0303311 | A1 | 10/2019 | Bilski et al. |
| 2020/0076720 | A1 | 3/2020 | Riani et al. |
| 2020/0244370 | A1* | 7/2020 | Stojanovic ............ H04B 10/61 |

OTHER PUBLICATIONS

Non-Final Office Action for U.S. Appl. No. 16/453,941 (dated Feb. 21, 2020).

Advisory Action for U.S. Appl. No. 16/453,941 (dated Nov. 27, 2020).

Notice of Allowance for U.S. Appl. No. 15/905,097 (dated Nov. 15, 2019).

Non-Final Office Action for U.S. Appl. No. 15/905,097 (dated Jun. 28, 2019).

Commonly-assigned, co-pending U.S. Appl. No. 16/453,941 for "Methods, Systems, and Computer Readable Media for Testing of Hardened Forward Error Correction (FEC) Implementaions," (Unpublished, filed Jun. 26, 2019).

"Anritsu Strengthens MP1900A BER Test Functions for More Efficient Verification of 400GbE Transceivers and DSP," Signal Integrity Journal, pp. 1-6 (Mar. 5, 2019).

"32 G/64 Gbaud Multi Channel PAM4 BERT," Anritsu envision: ensure, pp. 1-30 (Feb. 2019).

"Accelerating from 100GE to 400GE in the Data Center Advanced Modulation and Coding Challenges," Keysight Technologies, pp. 1-6 (Sep. 10, 2018).

Commonly-assigned, co-pending U.S. Appl. No. 15/905,097 for "Methods, Systems and Computer Readable Media for Evaluating Link or Component Quality Using Synthetic Forward Error Correction (FEC)," filed Feb. 26, 2018.

Wikipedia, "Forward Error Correction," Wayback Machine, pp. 1-6 (Accessed Dec. 26, 2017).

Mustafa et al, "Performance Evaluation of Variant Error Correction Schemes in Terms of Extended Coding Rates & BER for OFDM Based Wireless Systems," International Journal of Wireless Communications and Mobile Computing, vol. 4, Issue 1, pp. 7-11 (Jan. 2016).

Farrugia et al., "A Statistical Bit Error Generator for Emulation of Complex Forward Error Correction Schemes," IEEE, pp. 1-6 (2007).

Notice of Allowance and Fee(s) Due and Examiner-Initiated Interview Summary for U.S. Appl. No. 16/453,941 (dated Mar. 10, 2021).

\* cited by examiner

//METHODS, SYSTEMS, AND COMPUTER READABLE MEDIA FOR GENERATING ANALOG-DISTORTED TEST DATA

TECHNICAL FIELD

The subject matter described herein relates to testing devices. More specifically, the subject matter relates to methods, systems, and computer readable media for generating analog-distorted test data.

BACKGROUND

Conventional test systems can experience issues when attempting to test network nodes or system with realistic high speed forward error correction (FEC) encoded test data. For example, a test system may use a packet data generator to generate eight data streams or lanes of 50 Gigabits per second (Gbps) test data and may then use a multiplexer to combine the eight lanes into a 400 Gbps data stream for transmission using 4-level pulse amplitude modulation (PAM4). To generate a high speed data stream comprising multiple data lanes, the test system may be required to use a master clock or other time synchronization technique to keep the data lanes in sync. Further, to generating an FEC encoded high speed data stream comprising multiple data lanes, the test system may perform FEC encoding across all of the data lanes comprising the high speed data stream, which can make test data modifications difficult afterwards.

Hence, issues can arise if a packet data generator lacks capabilities, e.g., analog distortion or analog fuzzing features, that are needed for testing some aspect of network node functionality.

SUMMARY

Methods, systems, and computer readable media for generating analog-distorted test data are disclosed. According to one method for generating analog-distorted test data, the method occurs at a test system implemented using at least one processor and at least one memory. The method includes receiving configuration information for configuring a first data stream generator; generating, using the configuration information and the first data stream generator, at least one replacement data stream for replacing at least one output data stream of a plurality of output data streams concurrently generated by a second data stream generator; distorting the at least one replacement data stream at an analog or physical level; and sending the at least one replacement data stream to a multiplexer for generating combined output, wherein the combined output is generated using the at least one replacement data stream and the remaining plurality of output data streams.

A system for generating analog-distorted test data includes a test system. The test system is implemented using at least one processor and at least one memory. The test system is configured for: receiving configuration information for configuring a first data stream generator; generating, using the configuration information and the first data stream generator, at least one replacement data stream for replacing at least one output data stream of a plurality of output data streams concurrently generated by a second data stream generator; distorting the at least one replacement data stream at an analog or physical level; and sending the at least one replacement data stream to a multiplexer for generating combined output, wherein the combined output is generated using the at least one replacement data stream and the remaining plurality of output data streams.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for generating analog-distorted test data. When testing one or more network nodes, it may be desirable to generate realistic test data at various speeds. For example, a network operator may need to test whether a network device (e.g., a network switch) can handle 400 Gigabits per second (Gbps) of test traffic via a 400 Gigabit Ethernet (400 GE) connection. In this example, a test system may use a data stream generator (DSG) to generate eight synchronized or coordinated data streams at 50 Gbps and then combine those data streams to create a 400 Gbps data stream. However, while a test system can create a 400 Gbps data stream by combining multiple data streams, current test systems have trouble emulating high speed forward error correction (FEC) encoded data streams containing analog-distorted test data. For example, known analog distortion or fuzzing devices (e.g., equipment that adds noise to an output signal at the physical layer) lack the synchronization capability to generate distorted or fuzzed 50 Gbps FEC encoded data streams which can be multiplexed with data streams of a different source to create a 400 Gbps FEC encoded data stream.

In accordance with some aspects of the subject matter described herein, techniques, methods, and systems for generating analog-distorted test data are disclosed. For example, a test system may be configured to trigger a DSG (e.g., traffic data generator) to generate eight synchronized 50 Gbps FEC encoded test data streams. In this example, one of the eight data streams may be selected to be dropped and the other seven data streams may be sent to a data buffer, which is configured to delay the seven data streams thereby bringing the seven data streams into precise synchronization with a replacement data stream containing analog-distorted (e.g., fuzzed) test data, where the replacement data stream is concurrently generated by another DSG (e.g., a programmable DSG) and is identical in content to the selected data stream that is dropped (prior to the analog distortion). In another example, in lieu of or in addition to using a data buffer, bringing data streams into precise synchronization with a replacement data stream may involve triggering a first DSG to start generating data streams after or before a second DSG starts generating a replacement data stream, e.g., by using a programmable delay to send independent start signals to the DSGs. Continuing with this example, the synchronized seven data streams and the replacement data stream containing analog-distorted test data may be multiplexed together for creating an 400 Gbps FEC encoded test data stream containing analog-distorted test data.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
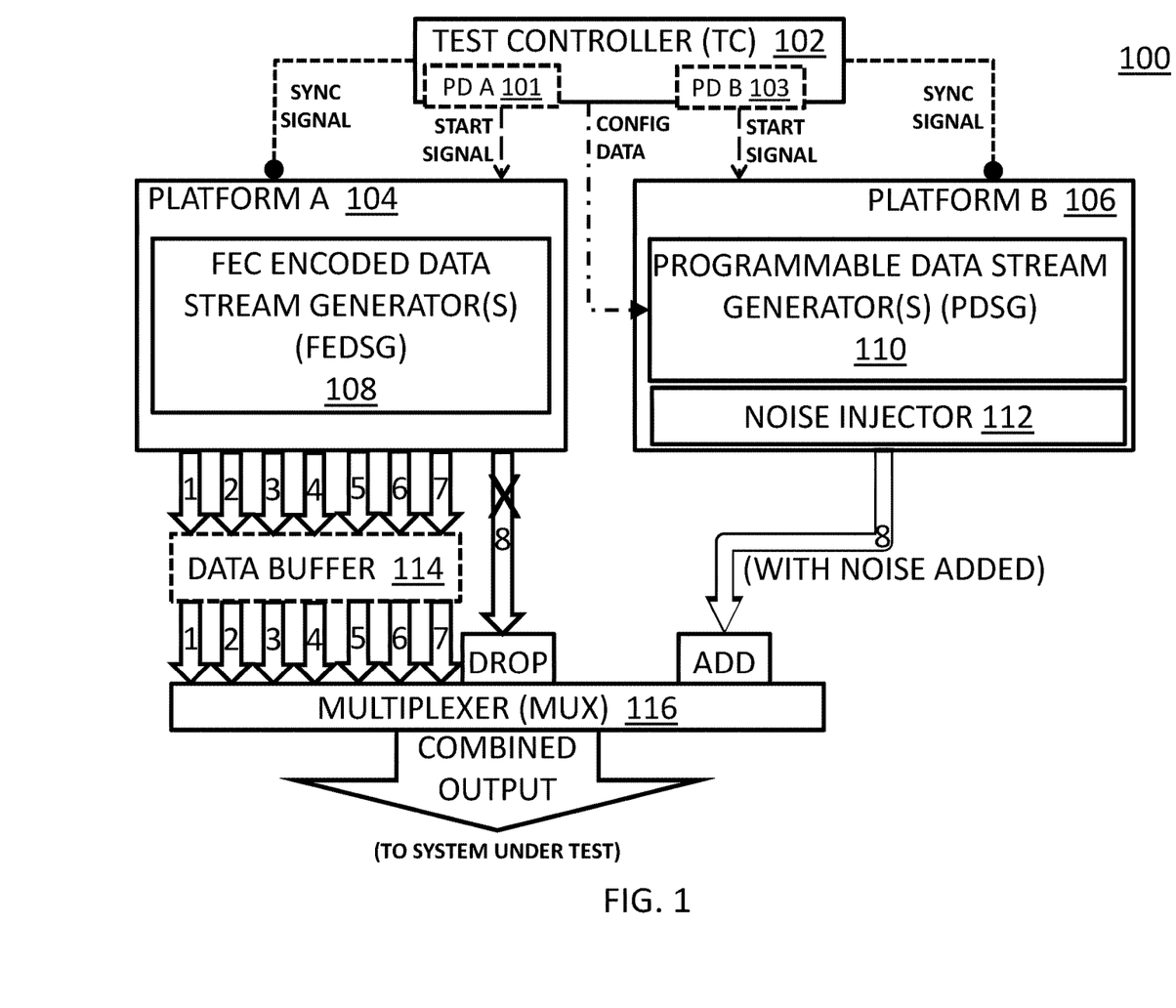
FIG. 1 is a diagram illustrating an example test system for generating analog-distorted test data.

FIG. 1 is a diagram illustrating an example test system 100 for generating analog-distorted test data. Referring to FIG. 1, test system 100 may represent any suitable entity or entities (e.g., one or more computing platforms, nodes, or devices) associated with testing one or more devices, systems, or links. For example, test system 100 may generate test traffic (e.g., data streams) for testing one or more links, e.g., 400 Gigabit Ethernet (GE), 200 GE, 100 GE or a related network node. In this example, test system 100 may generate a high speed FEC encoded data stream containing analog-distorted test data.

In some embodiments, test system 100 may include a stand-alone tool, a testing device, a test device or platform, or software executing on one or more processor(s). In some embodiments, test system 100 may be a single device or node or may be distributed across multiple devices or nodes. In some embodiments, test system 100 may include one or more modules for performing various test related functions. For example, test system 100 may include various DSGs for generating one or more analog-distorted FEC encoded data streams.

Test system 100 may include or interact with a test controller (TC) 103, platforms 104-106, one or more FEC encoded DSGs (FEDSG) 108, one or more programmable DSGs (PDSG) 110, a noise injector 112, a data buffer 114, and a multiplexer (MUX) 116. In some embodiments, test system 100 and/or related entities may include or provide a communications interface for communicating with a test operator. In such embodiments, the test operator may be any entity (e.g., an automated system or a device or system controlled or controllable by a human user) for selecting and/or configuring various aspects associated with generating analog-distorted test data. For example, user interfaces (e.g., an application programming interface (API) and a graphical user interface (GUI)) may be provided for inputting or modifying configuration information, such as tests to be performed, lane or stream to be distorted, types of distorting to be added, and/or other settings.

In some embodiments, one or more user interfaces at test system 100 may support automation, e.g., via a representation state transfer (REST) API, a command line, and/or a web-based GUI. For example, a test operator may use a web browser to interact with a web-based GUI at TC 102 for programming or configuring one or more aspects for testing, e.g., test data generation.

TC 102 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with controlling, configuring, and/or initiating testing or various aspects thereof, e.g., generating analog-distorted test data. In some embodiments, TC 102 may be implemented using one or more processors and/or memory. For example, TC 102 may utilize one or more processors (e.g., executing software stored in memory) to generate and send configuration information for configuring PDSG 110 and/or other test system entities. In this example, the configuration information may include time synchronization information, at least one stream identifier indicating at least one replacement data stream to generate, scrambler configuration data, and/or FEC encoder configuration data.

In some embodiments, TC 102 may also utilize one or more processors to initiate various tests and/or analyses involving generating high speed FEC encoded test data streams, where each high speed FEC encoded test data stream is created by combining multiple lower speed FEC encoded data streams using multiple DSGs. In this example, TC 102 may send instructions to various modules or entities in test system 100 for controlling (e.g., modify, pause, restart, or stop) data stream generation.

In some embodiments, TC 102 may include a master clock controller, a time synchronization module, or related functionality. For example, TC 102 may send sync signals (e.g., time synchronization information) periodically to keep common clocks or slave clocks synchronized at FEDSG 108 and PDSG 110 or their related platforms.

In some embodiments, TC 102 may provide a trigger signal to PDSG 110 and other DSGs for controlling (e.g., starting. pausing, restarting, or stopping) test data generation. For example, a start signal may be based on a master clock which is synchronized with other clocks at various FEDSG 108 and PDSG 110. In this example, by starting PDSG 110 and other DSGs at a same time (e.g., using synchronized clocks) and using a same source data, data streams generated by different DSGs can be identical.

In some embodiments, TC 102 may include or utilize programmable delays (PDs) 101 and 103. Each of PDs 101 and 103 may represent any suitable entity or entities (e.g., software executing on a processor, an ASIC, an FPGA, or a combination of software, an ASIC, and/or an FPGA) for sending a start signal or trigger signal to a DSG. For example, PD 101 may be a signaling device configured (e.g., by TC 102) to send a start or trigger signal to PDSG 110 at a particular time (e.g., 10:00:00:000 UTC) and PD 103 may be another signaling device configured (e.g., by TC 102) to send a start or trigger signal to FEDSG 108 at a different time (e.g., 10:00:00:820 UTC). In this example, PDs 101 and 103 may be configured to send start or trigger signals at different times so that the data streams from the different DSGs arrive at MUX 116 in synch or substantially in sync.

Platforms 104-106 may represent a device or computing platform for implementing DSGs and/or other test traffic generation functions. In some embodiments, platform 104 may include functions or capabilities that are different from platform 106. For example, platform 104 may include FEDSG 108 and platform 106 may include PDSG 110 and noise injector 112.

FEDSG 108 may represent any suitable entity or entities (e.g., software executing on a processor, an ASIC, an FPGA, or a combination of software, an ASIC, and/or an FPGA) associated with generating multiple FEC encoded data streams, e.g., data lanes. For example, FEDSG 108 may generate eight 50 Gbps FEC encoded test data streams concurrently. In this example, FEDSG 108 may use dedicated hardware, e.g., scrambler and FEC encoder modules implemented in a programmable logic device, such as an FPGA. In some embodiments, FEDSG 108 may be a single device or node or may be distributed across multiple devices or nodes. In some embodiments, FEDSG 108 may include one or more modules for generating one or more data streams, e.g., data lanes or data channels. For example, FEDSG 108 may include one or more modules for scrambling an input data source and also one or more modules for FEC encoding data across the one or more data lanes.

PDSG 110 may represent any suitable entity or entities (e.g., software executing on a processor, an ASIC, an FPGA, or a combination of software, an ASIC, and/or an FPGA) associated with generating at least one analog-distorted data stream, e.g., a data lane or a data channel, for replacing another non-distorted data stream (e.g., created by FEDSG 108). In some embodiments, PDSG 110 may be a single device or node or may be distributed across multiple devices or nodes. In some embodiments, PDSG 110 may include one or more modules for generating one or more data streams, e.g., data lanes or data channels. For example, PDSG 110 may receive configuration information from TC 102 for configuring one or more modules to generate output that is identical to a predetermined data stream (e.g., data lane '8') of eight 50 Gbps FEC encoded test data streams generated by FEDSG 108. In this example, after generating an identical data stream, the data stream may be provided to noise injector 112 for distorting the data stream at an analog or physical level (e.g., noise added to the physical signal representing the data stream.

Noise injector 112 may represent any suitable entity or entities (e.g., software executing on a processor, an ASIC, an FPGA, or a combination of software, an ASIC, and/or an FPGA) associated with distorting a data stream. For example, noise injector 112 may receive a data stream as an analog signal and may add noise or other distortion (e.g., at the physical layer) to the analog signal before sending the signal to MUX 116. In this example, the data stream or analog signal may be an electrical signal or an optical signal.

In some embodiments, FEDSG 108 and/or PDSG 110 (or noise injector 112) may send each data stream via a separate physical port, e.g., a PAM4 optical or electrical port. In some embodiments, FEDSG 108 and/or PDSG 110 (or noise injector 112) may send multiple data streams via a same port.

Data buffer 114 may be any suitable entity or entities (e.g., a storage device, memory, a non-transitory computer readable medium, or a storage system) for storing or buffering data. For example, data buffer 114 may include region of a physical memory storage used to temporarily store data while it is being moved from one process or entity to another process or entity.

In some embodiments, data buffer 114 may act as a delay buffer in that data buffer 114 stores data for a dynamic or static period of time. For example, seven data streams generated by FEDSG 108 may be sent to a data buffer 114. In this example, data buffer 114 may be configured to delay the seven data streams such that the seven data streams are in synchronization with a replacement data stream containing analog-distorted (e.g., fuzzed) test data concurrently generated by PDSG 110 and noise injector 112. In some embodiments, the length of time that data is stored in data buffer 114 may be based on the processing speed of PDSG 110 and noise injector 112, test operator settings, or using other information. For example, a processing speed of PDSG 110 and noise injector 112 or related processing time may be based on predetermined specifications, e.g., determined by the manufacturer of PDSG 110 and noise injector 112. In this example, MUX 116 or another entity may be configured to retrieve or obtain data from data buffer 114 using an amount of time based on the predetermined specifications.

In some embodiments, in lieu of or in addition to using data buffer 114, data streams from different DSGs may be synchronized (e.g., before reaching MUX 116) by staggering when the DSGs begin generating data streams. For example, assuming that generating a distorted data stream takes longer than generating non-distorted data streams, TC 102 or a related entity may use independent programmable delays or other mechanisms to trigger a first DSG (e.g., FEDSG 108) to start generating non-distorted data streams after a second DSG (e.g., PDSG 110) starts generating distorted data stream(s), e.g., by using a programmable delay to send independent start signals to the DSGs at different times. In another example, assuming that generating multiple non-distorted data streams takes longer than generating a single distorted data stream, TC 102 or a related entity may use independent programmable delays or other mechanisms to trigger a first DSG (e.g., FEDSG 108) to start generating non-distorted data streams before a second DSG (e.g., PDSG 110) starts generating a distorted data stream(s). In some embodiments, TC 102 or a related entity may trigger each DSG (e.g., using start signals) to begin data stream generation with great precision, e.g., within milliseconds or microseconds of each other.

MUX 116 may be any suitable entity or entities (e.g., hardware, software executing on a processor, an ASIC, an FPGA, or a combination of hardware, software, an ASIC, and/or an FPGA) for performing one or more aspects associated with combining lesser speed data streams (e.g., eight 50 GB/s data streams) into a high speed data stream (e.g., 400 Gb/s). For example, MUX 116 may include a physical wiring harness with electrical connectors, but no electronics (e.g., electronic circuits). In another example, MUX 116 may include an electronic device with various circuits capable of synchronizing and/or modifying input and/or output.

In some embodiments, MUX 116 may be capable of handling optical data streams or electrical data streams. For example, MUX 116 may be an optical MUX for combining optical data streams into a single optical output data stream (e.g., for transmitting over a fiber-optic cable). In another example, MUX 116 may be an electrical MUX for combining electrical data streams into a single electrical output data stream (e.g., for transmitting over a coaxial cable).

In some embodiments, MUX 116 may act as an add-drop multiplexer where one data stream from FEDSG 108 is dropped and one data stream from PDSG 110 is added to a combined output data stream. In this example, as depicted in FIG. 1, MUX 116 may combine seven FEC encoded test data streams originating from FEDSG 108 and one analog-distorted FEC encoded test data stream originating from PDSG 110 into a single high speed FEC encoded test data stream.

In some embodiments, output from MUX 116 may be sent to a system under test (SUT) via a high speed link or connection. For example, test system 100 may be configured to test optical nodes and may send test data via a 400 GE optical link. In another example, test system 100 may be configured to test network nodes in an electrical wire based network and may send test data via a 400 GE Ethernet link. In some embodiments, output from MUX 116 may include a PAM4 optical signal or a PAM4 electrical signal. In some embodiments, output from MUX 116 may include a non-return to zero (NRZ) optical signal or a NRZ electrical signal.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity or platform. In another example, some nodes and/or functions may be separated into multiple nodes or functions. It will also be appreciated that while platforms 104-106 are depicted as including separate DSGs, multiple DSGs may be collocated at a single platform.

Moreover, while FIG. 1 depicts two different types of DSGs providing data streams that are combined into a high speed data stream, some embodiments may involve multiple PDSGs 110 providing data streams that are combined into a high speed data stream.

Figure 2:
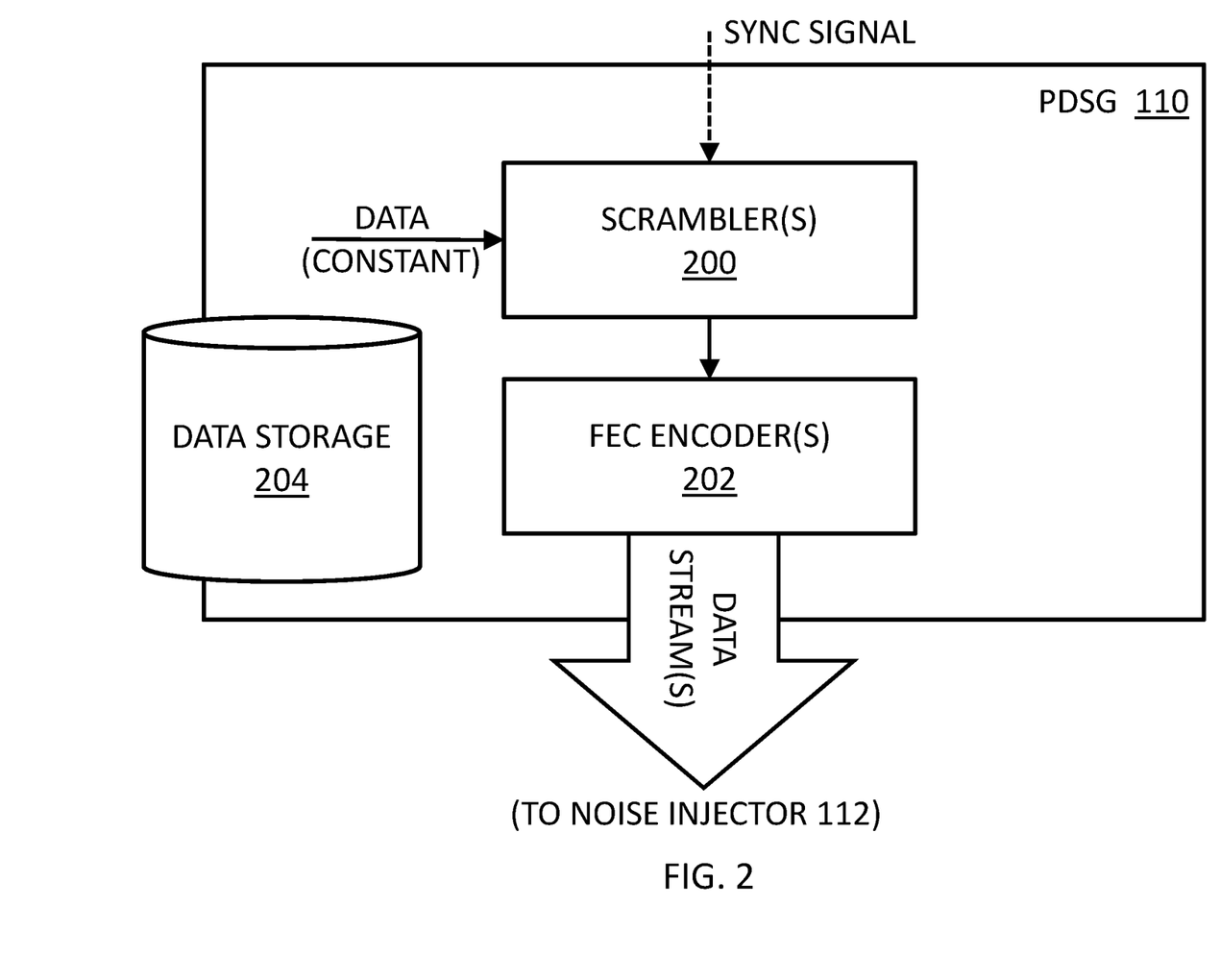
FIG. 2 is a diagram illustrating a programmable data stream generator for generating analog-distorted test data.

FIG. 2 is a diagram illustrating an example PDSG 110 for generating analog-distorted test data. PDSG 110 may represent any suitable entity or entities associated with generating at least one analog-distorted data stream, e.g., a data lane or a data channel, for replacing another non-distorted data stream (e.g., created by another DSG). In some embodiments, PDSG 110 may be a single device or node or may be distributed across multiple devices or nodes. In some embodiments, PDSG 110 may include one or more modules for generating one or more data streams, e.g., data lanes or data channels. For example, PDSG 110 may include one or more modules for scrambling an input data source and also one or more modules for FEC encoding data across the one or more data lanes.

In some embodiments, PDSG 110 may include components, modules, or entities with functionality similar to or the same as those entities described above with regard to FIG. 1. In some embodiments, PDSG 110 may include components, modules, or entities with additional and/or different functionality than those entities described above with regard to FIG. 1.

PDSG 110 may interact with TC 102 and/or a master clock controller. For example, TC 102 or a master clock controller may send sync signals periodically to keep a common clock or slave clock synchronized at PDSG 110 or a related platform.

In some embodiments, TC 102 may provide a trigger signal to PDSG 110 and other DSGs for controlling (e.g., starting, pausing, restarting, or stopping) data stream generation. For example, a start signal may be based on a master clock which is synchronized with other clocks at various DSGs. In this example, by starting PDSG 110 and other DSGs at a same time (e.g., using synchronized clocks) and using a same source data, data streams generated by different DSGs can be identical.

In some embodiments, PDSG 110 may include a time synchronization module or element represent any suitable entity for receiving a trigger signal that is interpreted as a test start signal, e.g., a signal to begin generating one or more FEC encoded test data streams. In such embodiments, FEDSG 108 or another DSG may also be configured to begin generating FEC encoded test data streams. For example, FEDSG 108 may start generating eight 50 Gbps FEC encoded test data streams, where each data stream or lane is generated using dedicated hardware, e.g., scrambler and FEC encoder modules implemented in a programmable logic device, such as an FPGA. In this example, PDSG 110 may be configured to generate output that is identical to a predetermined one of the eight 50 Gbps FEC encoded test data streams generated by FEDSG 108.

PDSG 110 may include scrambler(s) 200, FEC encoder(s) 202, and data storage 204. In some embodiments, PDSG 110 may utilize various scramblers 200 and FEC encoders 202 to generate one or more data streams. In some embodiments, PDSG 110 may utilize a separate scrambler 200 and FEC encoder 202 for each data stream to be generated. For example, PDSG 110 may include a number N of unique sets of FPGAs for generating N data streams, e.g., each set of FPGAs handles a different data stream.

Scrambler(s) 200 may be any suitable entity or entities (e.g., software executing on a processor, an ASIC, an FPGA, or a combination of software, an ASIC, and/or an FPGA) for performing one or more aspects associated with manipulating one or more data streams. For example, scrambler(s) 200 may be configured for receiving a data stream (e.g., raw data) and manipulating the data stream to give the data stream useful engineering properties. In this example, scrambler(s) 200 may replace some sequences (e.g., whitening sequences) without removing undesirable sequences so as to reduce the probability of occurrence of sequences that are troublesome for accurate transmission or reception.

In some embodiments, scrambler(s) 200 may include an additive (e.g., synchronous) scrambler or a multiplicative (self-synchronizing) scrambler. For example, an additive scrambler may transform an input signal (e.g., data stream) by applying a pseudo-random binary sequence (PRBS) (e.g., based on modulo-two addition) to the data stream and may use sync-words to ensure synchronization. In this example, the PRBS may be generated by a linear-feedback shift register (LFSR) or may predetermined and stored in memory. In another example, a multiplicative (e.g., self-synchronizing) scrambler may transform an input signal (e.g., data stream) by multiplying the input signal by the scrambler's transfer function in Z-space.

After one or more data streams are manipulated, the data stream(s) may be encoded by FEC encoder(s) 202. FEC encoder(s) 202 may be any suitable entity or entities (e.g., an IC, an FPGA, an ASIC, or software executing on at least one processor) for performing FEC or related actions. For example, FEC encoder(s) 202 may perform actions and/or operations to correct bit errors in a data stream or related data frames by using an FEC algorithm (e.g., a Viterbi algorithm or a Bahl, Cocke, Jelinek, and Raviv (BCJR) algorithm) and redundant data (e.g., error correction code (ECC) data) included in the data stream.

In some embodiments, if multiple data streams are being generated, FEC encoder(s) 202 may perform FEC encoding across the multiple data streams (e.g., data channels or data lanes). For example, FEC encoder(s) 202 may be configured to stripe FEC encoded data across multiple data streams. In this example, striping the data may rotate the individual data streams through all the available lanes of a high speed link (e.g., 100 GE or 400 GE) in a round robin fashion. By striping, burst errors generated by pass through re-timers within the link will have the length of any error burst effectively divided by the number of lanes used for the striping. For example, in a 400 GE link using eight lanes of 50 Gb/s test data, an error burst of 80 bits generated in an optical module on a single lane would result in only 20 errors on that single lane after the striping is deinterleaved at the end of the link (e.g., at a system under test).

In some embodiments, FEC encoder(s) 202 may provide metrics or data about its processing to outside entities. For example, FEC encoder(s) 202 may provide an API, a data file, or other mechanisms for obtaining performance metrics directly from FEC encoder(s) 202. In another example, after processing data, FEC encoder(s) 202 may store the processed data (e.g., error corrected data frames) in data storage 204 for analysis by test system 100 or a related entity.

In some embodiments, after encoded by FEC encoder(s) 202, a data stream may be received by noise injector 112 (not shown) and may be distorted at an analog level (e.g., a physical layer). For example, noise injector 112 may add noise to a physical signal representing a generated data stream. In this example, the noise may be random, pseudo-random, or configured based on a test operator or other entity.

In some embodiments, test system 100, MUX 116, and/or another entity may provide data stream or test data to a test operator or other entity for inspection or other purpose. For example, after generating a high speed data stream containing at least some analog-distorted test data, test system 100 may generate an interactive report for a related GUI. In this example, the interactive reports may use various GUI elements to allow a test operator to more closely inspect certain aspects related to the test data or the generated data stream.

In some embodiments, PDSG 110, scrambler(s) 200, FEC encoder(s) 202, and/or other entities in test system 100 may include functionality for accessing data storage 204 or other memory. Data storage 204 may be any suitable entity or entities (e.g., a storage device, memory, a non-transitory computer readable medium, or a storage system) for maintaining or storing information related to generating test data and/or other aspects associated with testing. For example, data storage 204 may store FEC processing times, input data (e.g., raw data for scrambling and FEC processing), output data (e.g., error corrected data after scrambling and FEC processing), test scheduling information, and FEC related metrics.

In some embodiments, data storage 204 may also contain information usable for configuring aspects of PDSG 110. For example, data storage 204 may contain configuration information for configuring scrambler(s) 200 and FEC encoder(s) 202 during one or more test scenarios. In this example, data storage 204 may store scrambling algorithms and encoding schemes which may be employed so that PDSG 110 can mimic or emulate a second DSG and generate identical data streams as the second DSG (before the data streams are subsequently distorted by noise injector 112).

In some embodiments, data storage 204 may also contain information usable for generating statistics and/or metrics associated with one or more aspects of PDSG 110. For example, data storage 204 may maintain metrics associated with one or more performance aspects of scrambler(s) 200 and FEC encoder(s) 202 during one or more test scenarios. In this example, the stored metrics may be usable for confirming that generated data streams were identical before being distorted by noise injector 112. In some embodiments, data storage 204 and/or memory may be located at test system 100, another node, or distributed across multiple platforms or devices.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity.

Figure 3:
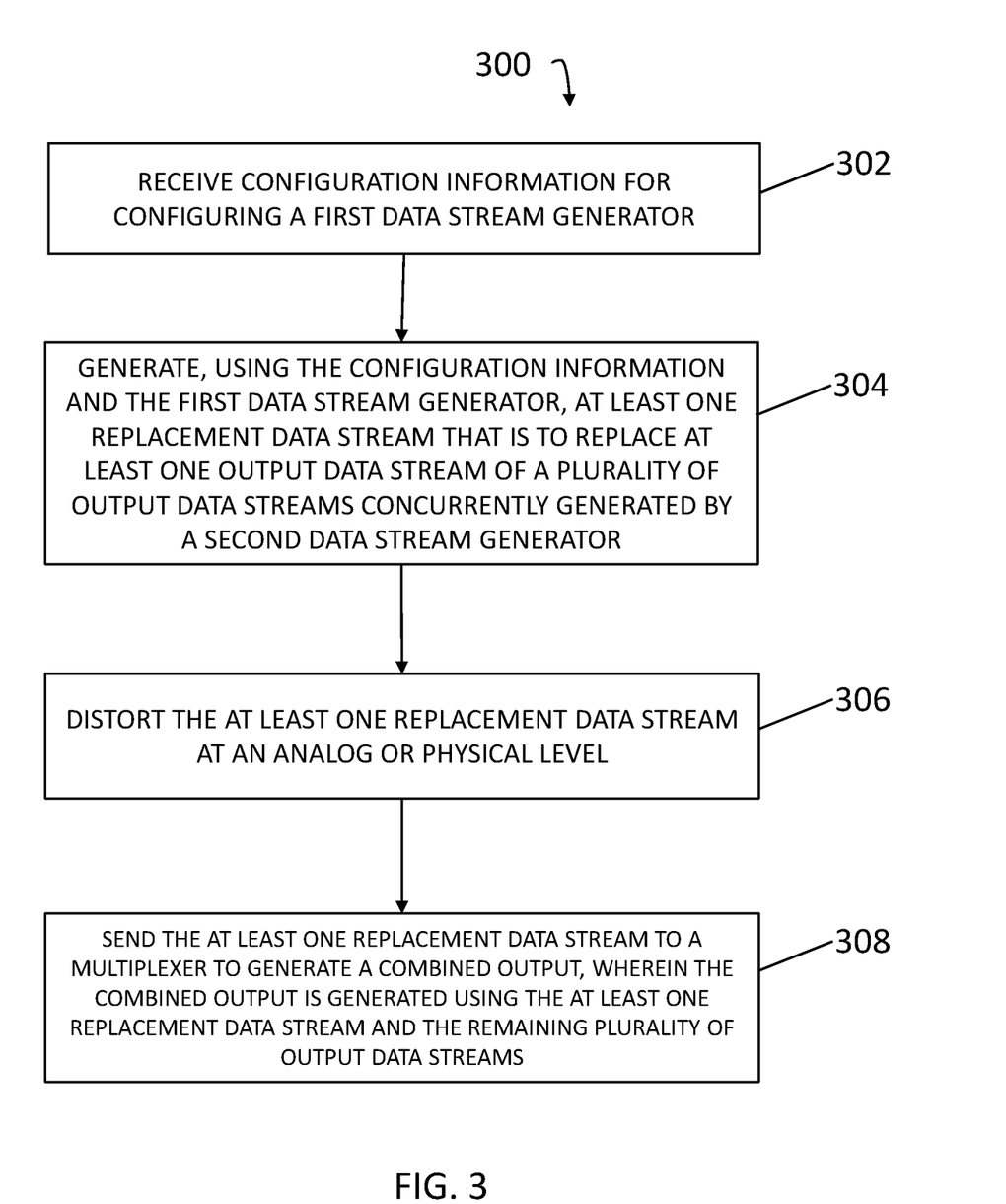
FIG. 3 is a diagram illustrating an example process for generating analog-distorted test data.

FIG. 3 is a diagram illustrating an example process 300 for generating analog-distorted test data. In some embodiments, example process 300, or portions thereof, may be performed by or at test system 100, platform 106, PDSG 110, and/or another node or module.

In step 302, configuration information for configuring a first DSG may be received. For example, a test operator or TC 102 may send configuration information to platform 106 and/or PDSG 110. In this example, the configuration information may be used to configure PDSG 110 such that PDSG 110 can generate one or more data streams (e.g., FEC encoded data channels or data lanes) that are identical to one or more data streams generated by another data lane generator (e.g., a second PDSG 110 or FEDSG 108).

In some embodiments, configuration information may include time synchronization information, at least one stream identifier indicating at least one replacement data stream to generate, scrambler configuration data, or FEC encoder configuration data.

In step 304, generating, using the configuration information and the first DSG, at least one replacement data stream for replacing at least one output data stream of a plurality of output data streams concurrently generated by a second DSG. For example, PDSG 110 can generate a data stream (e.g., an "eighth" FEC encoded data lane) that is identical to a data stream generated by another data lane generator (e.g., a second PDSG 110 or FEDSG 108).

In some embodiments, a first DSG may be implemented on a computing platform separate from a second DSG. For example, FEDSG 108 may be implemented on platform 104 and PDSG 110 may be implemented on platform 106.

In some embodiments, a first DSG may include or may interact with a scrambler engine and a forward error correction (FEC) engine. For example, PDSG 110 may include scrambler 200 and FEC encoder 202.

In some embodiments, a scrambler engine or an FEC engine may include an FPGA, an ASIC, an IC, a SoC, or software executing on at least one processor. For example, each of scrambler 200 and field encoder 202 may be implemented using a FPGA. In another example, each of scrambler 200 and field encoder 202 may be a software based module.

In step 306, the at least one replacement data stream may be distorted at an analog or physical level. For example, after an FEC encoded data stream is generated by PDSG 110, noise injector 112 may receive the data stream and add physical layer noise to the data stream before the data stream is received by MUX 116.

In step 308, the at least one replacement data stream may be sent to a multiplexer for generating combined output, wherein the combined output is generated using the at least one replacement data stream and non-distorted data streams generated by at least one DSG other than the first DSG. For example, MUX 116 may receive one or more analog-distorted data streams generated using PDSG 110 and one or more data streams generating using a second PDSG 110 or FEDSG 108.

In some embodiments, combined output may be based on a number of data streams used and bandwidths of the data streams used. For example, combined output from MUX 116 may be an 400 Gbps FEC encoded data stream, wherein the combined output may be generated using eight different data streams, and wherein each of the eight different data streams may be an 50 Gbps FEC encoded data stream.

In some embodiments, combined output (e.g., from MUX 116) may include a PAM4 optical signal or a PAM4 electrical signal. In some embodiments, combined output (e.g., from MUX 116) may include a non-return to zero (NRZ) optical signal or a NRZ electrical signal.

In some embodiments, non-distorted data streams (e.g., a plurality of output data streams from platform 104 that are not being replaced) may be buffered such that at least one replacement data stream and the non-distorted data streams are in synch. For example, a clock signal may be provided to a first DSG and a second DSG from a master clock controller (e.g., TC 102). In this example, each DSG may be synchronized such that the related data streams reach MUX 116 at the same time. Continuing with this example, some data streams (e.g., generated by FEDSG 108) may be buffered at data buffer 114 for some time to allow one or more analog-distorted replacement data streams to be generated (e.g., by PDSG 110 and noise injector 112), thereby the data streams are synchronized when combined by MUX 116.

In some embodiments, a second data stream generator may begin generating a plurality of output data streams (e.g., non-distorted data streams) after a first data stream generator begins generating at least one replacement data stream (e.g., a distorted version of one of the non-distorted data streams) such that the at least one replacement data stream and the remaining plurality of output data streams are in synch. For example, a clock signal may be provided to a first DSG and a second DSG from a master clock controller (e.g., TC 102). In this example, each DSG may be synchronized such that the related data streams reach MUX 116 at the same time. Continuing with this example, TC 102 or another entity may use independent programmable delays or other mechanisms for sending start signals to platform 104 and platform 106 at different times. In this example, one start signal may arrive and/or may trigger FEDSG 108 to start generating data streams after (e.g., 820 milliseconds after) after another start signal has arrived and/or triggered PDSG 110 to start generating a replacement data stream, thereby the data streams are synchronized when combined by MUX 116.

It will be appreciated that example process 300 is for illustrative purposes and that different and/or additional actions may be used. It will also be appreciated that various actions described herein may occur in a different order or sequence.

It should be noted that test system 100 and/or functionality described herein may constitute a special purpose computing device. Further, test system 100 and/or functionality described herein can improve the technological field of testing networks and/or systems by providing mechanisms for generating analog-distorted test data and for generating or emulating a high speed data stream containing analog-distorted test data. For example, test system 100 may synch multiple DSGs, where at least one data stream can be identically generated by different DSGs using the same source data. In this example, prior to combining multiple data streams to generate a high speed data stream, one data stream generated by a first DSG may be distorted at an analog level. Continuing with this example, MUX 116 may use this analog-distorted data stream in place of an otherwise identical data stream (e.g., that is generated by a second DSG).

The subject matter described herein for generating analog-distorted test data improves the functionality of test platforms and/or test tools by allowing test systems to emulate a high speed data stream (e.g., a 400 GE data stream) and stress test various high speed connections and/or processing functionality of various network nodes. For example, a test device or system can use multiple DSGs to generate related FEC encoded data streams and combine the data streams to create a high speed data stream, where at least one data stream used to create the high speed data stream is distorted at an analog level. It should also be noted that a computing platform that implements subject matter described herein may comprise a special purpose computing device (e.g., a test device) usable for generating and using analog-distorted test data, e.g., to test and analyze links or processing functionality.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating analog-distorted test data, the method comprising:
at a test system implemented using at least one processor and at least one memory:
receiving configuration information for configuring a first data stream generator;
generating, using the configuration information and the first data stream generator, at least one replacement data stream for replacing at least one output data stream of a plurality of output data streams concurrently generated by a second data stream generator, wherein each data stream of the at least one replacement data stream is identical in content to a corresponding output data stream of the at least one output data stream to be replaced;
distorting the at least one replacement data stream at an analog or physical level; and
sending the at least one replacement data stream to a multiplexer for generating combined output, wherein the combined output is generated using the at least one replacement data stream and the remaining output data streams of the plurality of output data streams.

2. The method of claim 1 wherein the configuration information includes time synchronization information, at least one stream identifier indicating the at least one replacement data stream to generate, scrambler configuration data, or forward error correction (FEC) encoder configuration data.

3. The method of claim 1 wherein the combined output is an optical signal or an electrical signal using four-level pulse amplitude modulation (PAM4).

4. The method of claim 1 wherein the combined output is a 400 Gigabit per second forward error correction (FEC) encoded data stream, wherein the combined output is generated using eight different data streams, and wherein each of the eight different data streams is a 50 Gigabit per second FEC encoded data stream.

5. The method of claim 1 wherein the remaining output data streams of the plurality of output data streams are buffered such that the at least one replacement data stream and the remaining output data streams of the plurality of output data streams are in synch; or wherein the first data stream generator and the second data stream generator start data stream generation at different times such that the at least one replacement data stream and the remaining output data streams of the plurality of output data streams are in synch.

6. The method of claim 1 wherein the first data stream generator and the second data stream generator are synchronized using a master clock.

7. The method of claim 1 wherein the first data stream generator is implemented on a computing platform separate from the second data stream generator.

8. The method of claim 1 wherein the first data stream generator includes or interacts with a scrambler engine and a forward error correction (FEC) engine.

9. The method of claim 8 wherein the scrambler engine or the FEC engine includes a field-programmable gateway array (FPGA), an application-specific integrated circuit (ASIC), an integrated circuit (IC), a system on a chip (SoC), or software executing on the at least one processor.

10. A system for generating analog-distorted test data, the system comprising:
   at least one processor;
   at least one memory; and
   a test system implemented using the at least one processor and the at least one memory, wherein the test system is configured for:
      receiving configuration information for configuring a first data stream generator;
      generating, using the configuration information and the first data stream generator, at least one replacement data stream for replacing at least one output data stream of a plurality of output data streams concurrently generated by a second data stream generator, wherein each data stream of the at least one replacement data stream is identical in content to a corresponding output data stream of the at least one output data stream to be replaced;
      distorting the at least one replacement data stream at an analog or physical level; and
      sending the at least one replacement data stream to a multiplexer for generating combined output, wherein the combined output is generated using the at least one replacement data stream and the remaining output data streams of the plurality of output data streams.

11. The system of claim 10 wherein the configuration information includes time synchronization information, at least one stream identifier indicating the at least one replacement data stream to generate, scrambler configuration data, or forward error correction (FEC) encoder configuration data.

12. The system of claim 10 wherein the combined output is an optical signal or an electrical signal using four-level pulse amplitude modulation (PAM4).

13. The system of claim 10 wherein the combined output is a 400 Gigabit per second forward error correction (FEC) encoded data stream, wherein the combined output is generated using eight different data streams, and wherein each of the eight different data streams is a 50 Gigabit per second FEC encoded data stream.

14. The system of claim 10 wherein the remaining output data streams of the plurality of output data streams are buffered such that the at least one replacement data stream and the remaining output data streams of the plurality of output data streams are in synch; or wherein the first data stream generator and the second data stream generator start data stream generation at different times such that the at least one replacement data stream and the remaining output data streams of the plurality of output data streams are in synch.

15. The system of claim 10 wherein the first data stream generator and the second data stream generator are synchronized using a master clock.

16. The system of claim 10 wherein the first data stream generator is implemented on a computing platform separate from the second data stream generator.

17. The system of claim 10 wherein the first data stream generator includes or interacts with a scrambler engine and a forward error correction (FEC) engine.

18. The system of claim 17 wherein the scrambler engine or the FEC engine includes a field-programmable gateway array (FPGA), an application-specific integrated circuit (ASIC), an integrated circuit (IC), a system on a chip (SoC), or software executing on the at least one processor.

19. A non-transitory computer readable medium comprising computer executable instructions embodied in the non-transitory computer readable medium that when executed by at least one processor of a computer perform steps comprising:
   at a test system implemented using at least one processor and at least one memory:
      receiving configuration information for configuring a first data stream generator;
      generating, using the configuration information and the first data stream generator, at least one replacement data stream for replacing at least one output data stream of a plurality of output data streams concurrently generated by a second data stream generator, wherein each data stream of the at least one replacement data stream is identical in content to a corresponding output data stream of the at least one output data stream to be replaced;
      distorting the at least one replacement data stream at an analog or physical level; and
      sending the at least one replacement data stream to a multiplexer for generating combined output, wherein the combined output is generated using the at least one replacement data stream and the remaining output data streams of the plurality of output data streams.

20. The non-transitory computer readable medium of claim 19 wherein the configuration information includes time synchronization information, at least one stream identifier indicating the at least one replacement data stream to generate, scrambler configuration data, or forward error correction (FEC) encoder configuration data.

* * * * *